US012715953B2

(12) United States Patent
Brandt et al.

(10) Patent No.: US 12,715,953 B2
(45) Date of Patent: Aug. 25, 2026

(54) METHOD FOR PREPARING A RESOL-TYPE PHENOLIC RESIN WITH REDUCED FORMALDEHYDE CONTENT

(71) Applicant: COMMISSARIAT À L'ENERGIE ATOMIQUE ET AUX ÉNERGIES ALTERNATIVES, Paris (FR)

(72) Inventors: Damien Brandt, Monts (FR); Nathanaël Chaussoy, Monts (FR); Jean-François Gerard, Monts (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 944 days.

(21) Appl. No.: 17/757,430

(22) PCT Filed: Nov. 30, 2020

(86) PCT No.: PCT/FR2020/052220
§ 371 (c)(1),
(2) Date: Jun. 15, 2022

(87) PCT Pub. No.: WO2021/123534
PCT Pub. Date: Jun. 24, 2021

(65) Prior Publication Data

US 2023/0044793 A1 Feb. 9, 2023

(30) Foreign Application Priority Data

Dec. 19, 2019 (FR) ...................................... 1914977

(51) Int. Cl.
*C08G 8/10* (2006.01)
*C08G 8/16* (2006.01)

(52) U.S. Cl.
CPC ................. *C08G 8/10* (2013.01); *C08G 8/16* (2013.01)

(58) Field of Classification Search
None
See application file for complete search history.

(56) References Cited

U.S. PATENT DOCUMENTS 4,433,120 A * 2/1984 Chiu ........................ C08L 61/06 427/393
4,663,419 A 5/1987 Saint-Gobain
6,608,162 B1 * 8/2003 Chiu .................... C09D 161/06 528/495
2013/0183524 A1 7/2013 Roncuzzi et al.

FOREIGN PATENT DOCUMENTS

EP 0148050 A2 10/1985
EP 0480778 A2 4/1992
JP 04198251 A * 7/1992
WO 2004018536 A1 3/2004

OTHER PUBLICATIONS

International Search Report for PCT/FR2020/052220 dated Feb. 18, 2022 and translation thereof.
Written Opinion for PCT/FR2020/052220 dated Feb. 18, 2022.
Search Report for French application No. FR1914977 dated Oct. 21, 2020.

* cited by examiner

*Primary Examiner* — Ha S Nguyen
(74) *Attorney, Agent, or Firm* — Chrisman Gallo Tochtrop LLC

(57) ABSTRACT

A method for preparing a resol-type phenolic resin comprising the following steps: a) a step of condensing phenol and formaldehyde, in a basic medium, the formaldehyde being in molar excess with respect to the phenol, at a condensation temperature of at least 50° C. until the phenol conversion rate is 50 to 80%, whereby a resol-type phenolic resin results comprising free formaldehyde; b) a step of measuring the free formaldehyde content of the phenolic resin obtained in a); c) a step of reducing the free formaldehyde content of the phenolic resin obtained in a) by placing it in contact with an aminophenolic compound in an excess amount with respect to the free formaldehyde and at a temperature lower than the condensation temperature of step a).

18 Claims, No Drawings

METHOD FOR PREPARING A RESOL-TYPE PHENOLIC RESIN WITH REDUCED FORMALDEHYDE CONTENT

CROSS-REFERENCE TO RELATED APPLICATIONS

This is a National Stage application of PCT international application PCT/FR2020/052220, filed on Nov. 30, 2020, which claims the priority of French Patent Application No. 1914977, filed Dec. 19, 2019, both of which are incorporated herein by reference in their entirety.

TECHNICAL FIELD

The present invention relates to a method for preparing a phenolic resin having, at the end of this method, a low formaldehyde content (hereafter referred to as free formaldehyde).

Phenolic resins, also commonly called phenoplast resins, result from the condensation of a phenolic compound (conventionally, phenol) with an aldehyde compound (conventionally, formaldehyde, also designated by the term formol) accompanying the formation of water molecules, this condensation leading to oligomers or condensates comprising a chain of aromatic cycles linked to one another by means of methylene groups, these oligomers subsequently able to then be transformed by thermal polycondensation in the possible presence of a catalyst in a three-dimensional network, giving rise to a highly resistant hardened material.

Historically, Von Baeyer was the first chemist to carry out works on the polycondensation of phenol and of formaldehyde in 1872, these works heralding those of Leo Beakeland, who developed, between 1907 and 1909, a method for manufacturing hardened materials from a phenolic resin. He was also able to highlight, when polycondensation is produced, in a basic medium, the following product states depending on the manufacturing temperature:

- a first state translating by a liquid resin, possibly pasty but remaining fusible and soluble, the resin in this state being qualified as a resol-type resin;
- a second state, when the temperature increases, translating by an intermediate condensation product (or in other words, where the phenol conversion rate is intermediary), this product being in the form of a product that is generally soluble, infusible but likely to be soft and being qualified as a resitol;
- a third state, when the temperature increases again, translating by a superior hard, infusible and soluble condensation product, that is resistant to acids and to high temperatures, this product being qualified as a recite.

Due to these various polycondensation states, the products from the polycondensation of phenol and of formaldehyde may be used in many fields of application, such as insulation, foundry, adhesives, laminates, moulding, paints. More specifically, resins are also applied in the field of aerospace, since the 1970s, where they may be used within the production of thermal protection coatings, in particular heat shields comprising, as matrix, a matrix from the crosslinking of a phenolic resin.

The most commonly used state is the resol-type phenolic resin that may be kept ready for use and due to its liquid or semi-liquid state be used, as a varnish, directly by simple application on a substrate, optionally after having been loaded with one or more fillers, followed by a crosslinking of the resin, whereby a hardened material (optionally composite, when it comprises fillers) results corresponding to a crosslinked three-dimensional network.

However, resol-type phenolic resins, due to a less significant condensation state (for example, with a phenol conversion rate ranging from 50 to 80%) also comprise free formaldehyde and phenol (that is to say not yet condensed). Yet formaldehyde is a category 1b carcinogenic, mutagenic, reprotoxic (CMR) compound, which as of 2026, by the REACH regulation, will come under Annex XVI, which means, in other terms, the prohibition of marketing any products comprising a formaldehyde content above 0.1%. Moreover, formaldehyde is a product from the oil industry.

In addition, due to this CMR classification, of the future REACH regulation and in view of the increasing scarcity of oil resources, there is a real need to propose resol-type phenolic resins with a reduced formaldehyde content, in particular to minimise the toxicity problems related to this product.

For this, it has been proposed to add, for the manufacture of the resin, a compound capable of reacting with free formaldehyde, for example, a primary amine compound likely to form an imine compound, these primary amine compounds may be, for example:

- urea, as described in EP0148050, with for drawback however that the reaction products of urea and of formaldehyde are not stable and may degrade at certain temperatures;
- ethanolamine described in EP0480778, ethanolamine reacting with residual phenol and formaldehyde to form hydroxybenzylaminoethanols, by means of the addition of a specific acid, sulphamic acid, which is a particularly expensive compound.

In view of what exists and the drawbacks mentioned above, the authors of the present invention have set themselves the objective of proposing a method for preparing a resol-type phenolic resin having a reduced free formaldehyde content (and, more specifically less than 0.1%) without the thermomechanical properties of the product subsequently resulting from the hardening of the resin being decreased.

DESCRIPTION OF THE INVENTION

Thus, the invention relates to a method for preparing a resol-type phenolic resin comprising the following steps:

a) a step of condensing phenol and formaldehyde, in a basic medium, the formaldehyde being in molar excess with respect to the phenol, at a condensation temperature of at least 50° C. until the phenol conversion rate is 50 to 80%, whereby a resol-type phenolic resin results comprising free formaldehyde;

b) a step of measuring the free formaldehyde mass content of the phenolic resin obtained in a);

c) a step of reducing the free formaldehyde mass content of the phenolic resin obtained in a) by placing it in contact with an aminophenolic compound in an excess amount with respect to the free formaldehyde and at a temperature lower than the condensation temperature of step a).

Before going into more detail in the description of this invention, we specify the following definitions.

Phenol conversion rate means the mass percentage of phenol having participated in the condensation reaction with formaldehyde for step a) with respect to the starting phenol, this conversion rate being determined by the following relation:

$$\tau = 1 - \frac{m_p}{m_p^i}$$

wherein:

τ corresponds to the phenol conversion rate;

$m^i_p$ corresponds to the initial mass (in g) of phenol in the reaction medium;

$m_p$ corresponds to the mass (in g) of residual or free phenol in the reaction medium at the end of the reaction, this mass of residual or free phenol being determined from data from the gas chromatography technique coupled with mass spectrometry (this technique being known under the abbreviation GCMS).

A precise protocol for determining the phenol conversion rate is provided in the part relating to the detailed description of specific embodiments.

Free formaldehyde means formaldehyde that has not reacted for the condensation reaction of step a).

As mentioned above, the method of the invention comprises, firstly, a step of condensing phenol and formaldehyde, in a basic medium, the formaldehyde being in molar excess with respect to the phenol, at a condensation temperature of at least 50° C. until the phenol conversion rate is 50 to 80%, whereby a resol-type phenolic resin results comprising free formaldehyde. The formaldehyde initially used may be in aqueous solution (for example, an aqueous solution comprising formaldehyde up to 37% by mass in water).

More specifically, the condensation step is performed in the sole presence of phenol, of formaldehyde, optionally in aqueous solution, and of the basic medium (which means, in other terms, that it does not require other ingredients).

More specifically, the basic medium, wherein the reaction takes place, may be an aqueous solution comprising one or more bases, such as NaOH, $Na_2CO_3$, KOH, $K_2CO_3$, $Ba(OH)_2$, $NH_3$, a primary amine, a secondary amine and mixtures thereof, with for preference, an aqueous solution comprising, as base, $NH_3$ (i.e., in other terms, ammonium hydroxide).

The base(s) of the basic medium act as catalyst of the condensation reaction and are, preferably, present in a content ranging from 1 to 20% molar with respect to the number of moles of phenol initially present in the condensation step used (that is to say before the condensation reaction has started).

The formaldehyde is in molar excess with respect to the phenol and, more specifically, the mole ratio (formaldehyde/phenol) is greater than 1 and may go up to 3. In particular, it may range from 1.1 to 2. It is understood that the molar excess is defined in reference to the formaldehyde initially used (that is to say before the condensation reaction has started) and to the phenol initially used (that is to say before the condensation reaction has started).

Finally, for step a), the condensation temperature is set at a value greater than 50° C. and, more specifically, may range from 50 to 100° C.

More specifically, the condensation step a) may be implemented by the sequence of following operations:

- an operation of placing in contact phenol and formaldehyde, the formaldehyde being in molar excess with respect to the phenol, the placing in contact being performed under stirring and at a temperature for obtaining a homogeneous mixture (for example, a temperature of 40° C.);
- an operation of adding a basic medium to the homogeneous mixture, the resulting mixture being heated to a temperature corresponding to the condensation temperature and being maintained until the desired phenol conversion rate is obtained (this desired rate ranging from 50 to 80%), which may be measured by gas chromatography coupled with mass spectrometry;
- an operation of stopping the heating once the desired phenol conversion rate has been reached.

Before implementing step b), the method may comprise a step of adding to the resin obtained at the end of step a) at least one organic solvent, such as an alcoholic solvent (for example, ethanol).

At the end of step a), the resin obtained is a resin comprising phenol and formaldehyde condensates and further comprising free formaldehyde and free phenol.

From the resin obtained at the end of step a), it is determined, according to the method of the invention, the free formaldehyde content, for example, by chemical determination according to the standard ISO11402 08/2005 (Hydroxylamine hydrochloride procedure), this determination step being necessary to determine the amount of aminophenolic compound of step c).

A precise protocol for determining the free formaldehyde conversion rate is provided in the part relating to the detailed description of specific embodiments.

The aminophenolic compound of step c) may be a phenolic compound comprising at least one $—NH_2$ primary amine group and, more specifically, may be a phenolic compound including in ortho, meta or para position of the —OH group, an $NH_2$ primary amine group with preferably an $—NH_2$ primary amine group in ortho or para position of the —OH group, the other carbon atoms of the phenolic cycle may be linked to a hydrogen atom, a $C_1$-$C_5$ alkyl group, a methoxy group, an OH group or a $NH_2$ group.

More specifically, the aminophenolic compound may meet the following formula:

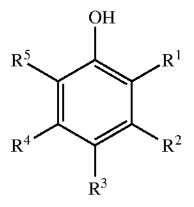

wherein $R^1$ to $R^5$ represent, independently of one another, a hydrogen atom, a $C_1$-$C_5$ alkyl group, a methoxy group, an OH group or an $NH_2$ group with for conditions that one at least of $R^1$ or $R^3$ represents an $NH_2$ group and one at least of $R^1$, $R^3$ or $R^5$ represents a hydrogen atom.

Otherwise formulated, the conditions may be formulated as such:

- one at least of $R^1$ or $R^3$ represents an $NH_2$ group and
- when $R^1$ is an $NH_2$ group, one at least of $R^3$ or $R^5$ represents a hydrogen atom;
- when $R^3$ is an $NH_2$ group, one at least of $R^1$ or $R^5$ represents a hydrogen atom;
- when $R^1$ and $R^3$ are $NH_2$ groups, $R^5$ represents a hydrogen atom.

Even more specifically, $R^1$ represents an $NH_2$ group and $R^2$ to $R^5$ represent a hydrogen atom, in which case the aminophenolic compound is 2-aminophenol or $R^3$ represents an $NH_2$ group and $R^1$, $R^2$, $R^4$ and $R^5$ represent a hydrogen atom, in which case the aminophenolic compound is 4-aminophenol, the preferred aminophenolic compound being 2-aminophenol.

The aminophenolic compound is used in an excess amount with respect to the amount of free formaldehyde and, more specifically, in an amount ranging from 1.1 to 1.3 equivalent with respect to the free formaldehyde.

Before adding to the resin at the end of step a), the aminophenolic compound may be placed in solution beforehand in an organic solvent, and more specifically, an alcoholic solvent, such as ethanol or a mixture of an organic solvent and water.

Step c) is implemented at a temperature lower than the condensation temperature of step a), for example, a temperature that may range from 30° C. to 50° C., which means, in other words, that the condensation reaction of step a) does not continue, the temperature of step c) making possible, on the other hand, a reaction between the free formaldehyde and the aminophenolic compound and, more specifically, the reaction producing an imine compound resulting from the reaction of the aldehyde group of the free formaldehyde and of the primary amine group of the aminophenolic compound, the aminophenolic compound fulfilling the function of trapping the free formaldehyde. The invention may thus also be defined as being the use of an aminophenolic compound to trap the free formaldehyde present in a resol-type phenolic resin.

Step c) is performed, advantageously, in the sole presence of the aminophenolic compound optionally placed in solution.

After step c), the method of the invention may further comprise a vacuum concentration step (for example, up to 40 mbar), for example, so as to eliminate at least one portion of the solvents optionally used.

After step c) or after the possible condensation step, the method of the invention may further comprise a step of distilling the resin at a distillation temperature making it possible to eliminate at least one portion of the formaldehyde (for example, a temperature of 40° C. under a pressure of 40 mbar), in particular, so as to purify the resin obtained and to also reduce the residual free formaldehyde content.

At the end of the method of the invention, the resin obtained is a resol-type phenolic resin comprising phenol and formaldehyde condensates and imine compounds resulting from the reaction of the aminophenolic compound and of the free formaldehyde.

Thus, the invention also relates to a resol-type phenolic resin likely to be obtained by the method subject matter of the invention and that as defined above, said resin comprising phenol and formaldehyde condensates (that is to say, more specifically, hydroxymethylphenols and condensates comprising a chain of phenyl groups linked to one another by methylene groups) and imine compounds resulting from the reaction of the aminophenolic compound and of the free formaldehyde, said resin may also be characterised by a very low formaldehyde mass content, for example, below 0.1% by mass with respect to the total mass of the resin.

The presence of imine compounds such as defined above in the resins of the invention is particularly advantageous, because they may be inserted into the network resulting in a subsequent hardening of the resin (thus corresponding to a hardened material or resite), without reducing the thermomechanical properties of the hardened material.

In addition, the resins in accordance with the invention may be used to obtain the following materials:

- hardened materials (that may also be qualified as recites) from the hardening of a resol-type phenolic resin in accordance with the invention;
- composite materials consisting of a matrix made of a hardened material obtained by hardening a resol-type phenolic resin in accordance with the invention, said matrix trapping one or more fillers, for example, inorganic, such as glass fibers.

Thus, to finish, the invention also relates to the following objects:

- a hardened material (that may be qualified as a resite) after hardening a resol-type phenolic resin in accordance with the invention and with a method for obtaining said hardened material; and
- a composite material consisting of a matrix made of a hardened material obtained by hardening a resol-type phenolic resin in accordance with the invention, said matrix trapping one or more fillers and a method for obtaining said composite material.

More specifically, the method for obtaining a hardened material (that may be qualified as a recite) comprises the following successive steps:

- a step of implementing the method for preparing a resol-type phenolic resin such as defined above;
- a step of hardening the resin thus obtained by heating the latter to a hardening temperature, for example, a temperature ranging from 120° C. to 200° C., for example, a temperature of 175° C.

The method for obtaining a composite material such as defined above comprises the following successive steps:

- a step of implementing the method for preparing a resol-type phenolic resin such as defined above;
- a step of adding to the resin thus obtained one or more fillers;
- a step of hardening the resin comprising one or more fillers by heating the latter to a hardening temperature, for example a temperature ranging from 120° C. to 200° C., for example, a temperature of 175° C., whereby a composite material results comprising a matrix resulting from the hardening of the resin and the filler(s) dispersed in the matrix.

Other features and advantages of the invention will become apparent from the additional description that follows and that relates to specific embodiments.

Of course, this additional description is given by way of illustration of the invention and in no way constitutes a limitation.

DETAILED DESCRIPTION OF SPECIFIC EMBODIMENTS

In the following examples, the phenol conversion rate and the free formaldehyde content are evaluated by the following precise protocols.

Evaluation of the Phenol Conversion Rate

Firstly, a calibration curve is produced by GCMS analysis of 6 samples with various phenol concentrations in acetone. These concentrations range from 0.5% to 12% (mass percentages of phenol in the solution) per stage of approximately 2%. The area measurement of the phenol peak is performed and a calibration curve c=f(A) is obtained, c corresponding the concentration of phenol in the sample and A to the area of the phenol peak on the GCMS chromatograph (standard turbo pump and electronic impact ionisation mass detector from the brand Agilent model 5975C TAD inert MSD).

In the reaction medium subject matter of the condensation step, a known amount ($m_{sample}$≈200 mg) of the reaction medium is sampled and dissolved in acetone ($m_{acetone}$≈700 mg). After GCMS analysis, the area of the phenol peak is measured and the concentration in the sample is calculated from the curve c=f(A).

The amount of residual phenol in the reaction medium is then calculated according to the following formula:

$$m_P = c \times \frac{(m_{sample} + m_{acetone})}{m_{sample}} \times m_{tot}$$

wherein:

$m_p$=mass of residual phenol (in g) in the reaction medium c=mass concentration in % calculated by GCMS analysis $m_{sample}$=mass of the sample (in g) taken in the reaction medium (or of the resin)

$m_{acetone}$=mass of acetone (in g) added before GCMS analysis $m_{tot}$=total mass of the reaction medium (sum of the masses of the reagents) (in g)

The conversion rate is calculated from the formula:

$$\tau = 1 - \frac{m_p}{m_p^i}$$

wherein:

τ=conversion rate in the reaction medium $m^i_p$=initial mass of phenol (in g) in the reaction medium Within the scope of the method for preparing the resol-type resin, the condensation reaction is stopped once the phenol conversion rate has reached the desired value, this should range between 50 to 80%.

Evaluation of the Free Formaldehyde Mass Content According to the Standard ISO11402 08/2005

The free formaldehyde content is determined by potentiometric back-titration of hydrochloric acid for the reaction below:

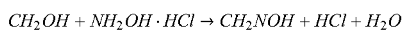

In a 250 mL beaker, a mass m of approximately 5 g of resin is solubilised in 50 mL of methanol under magnetic stirring and at ambient temperature (23±1° C.). Then the electrodes of the pH-meter are introduced into the solution and the pH is adjusted to 3.5 with the aid of a solution of HCl 1 M. Subsequently with the aid of a pipette approximately 25 mL of a hydroxylamine hydrochloride solution (10% by mass in water and the pH of which has been adjusted to 3.5 with the aid of a sodium hydroxide solution at 0.1 M) are added to the solution. The mixture is stirred for 10 minutes then with the aid of a burette, a sodium hydroxide solution 0.1 M (the concentration of which will have been titrated beforehand) is added until the pH returns to 3.5.

At the same time, a similar test is carried out but by omitting the addition of the resin in the solution (this test may be qualified as a blank test).

The free formaldehyde w($CH_2O$) mass content is then obtained from the formula:

$$w(\text{free } CH_2O) = \frac{3c(V1 - V0)}{m}$$

wherein:

c is the concentration, in moles per litre of the sodium hydroxide solution used for the titration V0 is the volume in mL of the sodium hydroxide solution used for the blank test V1 is the volume in mL of the sodium hydroxide solution used for the test with the resin m is the mass in g of resin used.

Example 1

The present example illustrates a method for preparing a resol-type phenolic resin with a mole ratio (formaldehyde/phenol) of 1.3.

For this, phenol (94.11 g, 1.00 mol) and formaldehyde at 37% by mass in water (105.51 g, 1.30 mol) are mixed at 40° C. in a 500 mL single-neck round-bottom flask. Once a homogeneous mixture has been obtained, ammonium hydroxide at 28% by mass in water (3.04 g, 0.05 mol) is added. The reaction medium is mechanically stirred and heated to 60° C. for 48 hours. The phenol conversion rate measured according to the protocol mentioned above is 67%. The heating is stopped and 25.28 g of ethanol are added to obtain a homogeneous medium. The formaldehyde mass content measured by chemical determination according to the protocol mentioned above is 2.2%.

Subsequently, 2-aminophenol (15.53 g, 0.14 mol) is mixed with 400 mL of ethanol. This mixture is added to 161.78 g of the resin obtained above and the free formaldehyde content of which is 2.2%. The medium is stirred at 40° C. for 15 minutes then vacuum concentrated up to 40 mbar. A black resin is obtained with a mass of 154.34 g. The resin has a phenol mass content of 9% and a formaldehyde mass content of 0.09%.

Finally, 16.90 g of the resin are introduced into a 50 ml round-bottom flask and vacuum distilled at 40 mbar and 40° C. for 30 minutes. A black resin is obtained with a mass of 13.92 g and has a phenol mass content of 17% and a formaldehyde mass content of <<0.1% (not measurable).

Example 2

The present example illustrates a method for preparing a resol-type phenolic resin with a mole ratio (formaldehyde/phenol) of 2.

For this, phenol (47.06 g, 0.50 mol) and formaldehyde at 37% by mass in water (81.16 g, 1.00 mol) are mixed at 40° C. in a 250 mL single-neck round-bottom flask. Once a homogeneous mixture has been obtained, ammonium hydroxide at 28% by mass in water (1.52 g, 0.025 mol) is added. The reaction medium is mechanically stirred and heated to 60° C. for 48 hours. The phenol conversion rate measured according to the protocol defined above is 69%. The heating is stopped and 14.17 g of ethanol are added to obtain a homogeneous medium. The formaldehyde mass content measured by chemical determination according to the protocol defined above is 8.3%.

Subsequently, 2-aminophenol (8.22 g, 0.075 mol) is mixed with 200 mL of ethanol. This mixture is added to 22.70 g of a resin obtained above and the free formaldehyde mass content of which is 8.3%. The medium is stirred at 40° C. for 15 minutes then vacuum concentrated up to 40 mbar. A black resin is obtained with a mass of 23.04 g. The resin has a phenol mass content of 9% and a formaldehyde mass content of <0.1%.

Example 3

The present example illustrates a method for preparing a resol-type phenolic resin with a mole ratio (formaldehyde/phenol) of 1.3.

For this, phenol (94.11 g, 1.00 mol) and formaldehyde at 37% by mass in water (105.51 g, 1.30 mol) are mixed at 40° C. in a 500 mL single-neck round-bottom flask. Once a homogeneous mixture has been obtained, ammonium hydroxide at 28% by mass in water (3.04 g, 0.05 mol) is added. The reaction medium is mechanically stirred and heated to 60° C. for 48 hours. The phenol conversion rate measured according to the protocol above is 67%. The heating is stopped and 25.28 g of ethanol are added to obtain a homogeneous medium. The formaldehyde mass content measured by chemical determination according to the protocol mentioned above is 2.2%.

Subsequently, 4-aminophenol (1.65 g, 0.015 mol) is mixed with 160 g of an ethanol/water isomassic mixture. This mixture is added to 19.70 g of the resin obtained above and the free formaldehyde content of which is 2.2%. The medium is stirred at 40° C. for 15 minutes then vacuum concentrated up to 40 mbar. A black resin is obtained with a mass of 15.77 g. The resin has a phenol mass content of 8% and a formaldehyde mass content of <0.1%.

Example 4

The present example illustrates a method for preparing a resol-type phenolic resin with a mole ratio (formaldehyde/phenol) of 2.

For this, phenol (47.06 g, 0.50 mol) and formaldehyde at 37% by mass in water (81.16 g, 1.00 mol) are mixed at 40° C. in a 250 mL single-neck round-bottom flask. Once a homogeneous mixture has been obtained, ammonium hydroxide at 28% by mass in water (1.52 g, 0.025 mol) is added. The reaction medium is mechanically stirred and heated to 60° C. for 48 hours. The phenol conversion rate measured according to the protocol mentioned above is 69%. The heating is stopped and 14.17 g of ethanol are added to obtain a homogeneous medium. The formaldehyde mass content measured by chemical determination according to the protocol mentioned above is 8.3%.

Subsequently, 4-aminophenol (8.19 g, 0.075 mol) is mixed with 200 mL of ethanol. This mixture is added to 22.61 g of a resin obtained above and the free formaldehyde content of which is 8.3%. The medium is stirred at 40° C. for 15 minutes then vacuum concentrated up to 40 mbar. A black resin is obtained with a mass of 24.04 g. The resin has a phenol mass content of 7% and a formaldehyde mass content of 1.8%.

Comparative Example 1

The present example illustrates a method for preparing a resol-type phenolic resin with a mole ratio (formaldehyde/phenol) of 1.3, the method not being in accordance with the invention since it does not include the addition of aminophenolic compound.

For this, phenol (94.11 g, 1.00 mol) and formaldehyde at 37% by mass in water (105.51 g, 1.30 mol) are mixed at 40° C. in a 500 mL single-neck round-bottom flask. Once a homogeneous mixture has been obtained, ammonium hydroxide at 28% by mass in water (3.04 g, 0.05 mol) is added. The reaction medium is mechanically stirred and heated to 60° C. for 48 hours. The phenol conversion rate measured according to the protocol mentioned above is 67%. The heating is stopped and 25.28 g of ethanol are added to obtain a homogeneous medium.

Subsequently, 54.40 g of the resin obtained is introduced into the 50 mL round-bottom flask and vacuum distilled at 40 mbar and 40° C. for 30 minutes. An orange resin of mass 42.55 g is obtained having a phenol mass content of 17% and a formaldehyde mass content of 2.2%.

It is clear that the results are much less effective than in example 1, wherein an aminophenolic compound has been added.

Comparative Example 2

The present example illustrates a method for preparing a resol-type phenolic resin with a mole ratio (formaldehyde/phenol) of 2, the method not being in accordance with the invention since it does not include the addition of aminophenolic compound.

For this, phenol (47.06 g, 0.50 mol) and formaldehyde at 37% by mass in water (81.16 g, 1.00 mol) are mixed at 40° C. in a 250 mL single-neck round-bottom flask. Once a homogeneous mixture has been obtained, ammonium hydroxide at 28% by mass in water (1.52 g, 0.025 mol) is added. The reaction medium is mechanically stirred and heated to 60° C. for 48 hours. The phenol conversion rate measured according to the protocol defined above is 69%. The heating is stopped and 14.17 g of ethanol are added to obtain a homogeneous medium.

Subsequently, 27.44 g of the resin obtained is introduced into the 50 mL round-bottom flask and vacuum distilled at 40 mbar and 40° C. for 30 minutes. An orange resin of mass 16.03 g is obtained having a phenol mass content of 16% and a formaldehyde mass content of 11.6%.

It is clear that the results are much less effective than in example 2, wherein an aminophenolic compound has been added.

Comparative Example 3

The present example illustrates a method for preparing a resol-type phenolic resin with a mole ratio (formaldehyde/phenol) of 1.3, the method not being in accordance with the invention since it includes the addition of a compound that is not an aminophenolic compound.

For this, phenol (94.11 g, 1.00 mol) and formaldehyde at 37% by mass in water (105.51 g, 1.30 mol) are mixed at 40° C. in a 500 mL single-neck round-bottom flask. Once a homogeneous mixture has been obtained, ammonium hydroxide at 28% by mass in water (3.04 g, 0.05 mol) is added. The reaction medium is mechanically stirred and heated to 60° C. for 48 hours. The phenol conversion rate measured according to the protocol defined above is 67%. The heating is stopped and 25.28 g of ethanol are added to obtain a homogeneous medium. The formaldehyde mass content measured by chemical determination according to the protocol defined above is 1.9%.

Subsequently, in a 100 mL single-neck round-bottom flask, 15.13 g of the resin thus prepared and ethanolamine (1.08 g) are introduced. The mixture is stirred for 15 minutes at 40° C. then vacuum distilled at 40 mbar, 40° C. for 20 minutes. A brown resin with a mass of 12.78 g is obtained. The resin has a phenol mass content of 20% and a formaldehyde mass content of 0.7%.

It is clear that the results are less effective than in example 1, wherein an aminophenolic compound has been added.

Comparative Example 4

The present example illustrates a method for preparing a resol-type phenolic resin with a mole ratio (formaldehyde/ phenol) of 1.3, the method not being in accordance with the invention since it includes the addition of a compound that is not an aminophenolic compound.

For this, phenol (94.11 g, 1.00 mol) and formaldehyde at 37% by mass in water (105.51 g, 1.30 mol) are mixed at 40° C. in a 500 mL single-neck round-bottom flask. Once a homogeneous mixture has been obtained, ammonium hydroxide at 28% by mass in water (3.04 g, 0.05 mol) is added. The reaction medium is mechanically stirred and heated to 60° C. for 48 hours. The phenol conversion rate measured according to the protocol defined above is 67%. The heating is stopped and 25.28 g of ethanol are added to obtain a homogeneous medium. The formaldehyde mass content measured by chemical determination according to the protocol defined above is 1.9%.

Subsequently, in a 100 mL single-neck round-bottom flask, 15.01 g of the resin thus prepared and urea (1.03 g) are introduced. The mixture is heated for 2 hours at 60° C. then vacuum distilled at 40 mbar, 40° C. for 20 minutes. A brown resin with a mass of 14.55 g is obtained. The resin has a phenol mass content of 23% and a formaldehyde mass content of 0.3%.

It is clear that the results are less effective than in example 1, wherein an aminophenolic compound has been added.

Example 5

In this example, resins of the preceding examples have been subjected to a hardening step by heating to form a hardened material (or resite).

More specifically, the resins have been degassed beforehand at a temperature ranging from 40 to 60° C. and a reduced pressure then have been heated under nitrogen according to a cycle adapted up to a temperature of 175° C. (the cycle consisting, more specifically, in heating for 2 hours at 60° C. under 20 mbar of air then 3 hours at 100° C. then finally 12 hours at 175° C. under nitrogen atmospheric pressure).

From the hardened materials, firstly, a thermogravimetric analysis and, secondly, a Soxhlet extraction have been carried out.

The thermogravimetric analyses are performed with a TGA-Q500 apparatus from TA Instruments. For this, an argon ramp is used at 20° C./min up to 1,000° C. The residue at 1,000° C. is called carbon yield and is qualified by a carbon percentage (% C) and the temperature at 5% by mass of degradation is called $Td_{5\%}$. In the table below, the thermal properties of the recites obtained from the resins of examples 1, 2, 3 and 4 and of comparative examples 1, 2, 3 and 4 are described.

| Example | Compound added | % C | $Td_5\%$ | Formaldehyde content |
|---|---|---|---|---|
| Comparative 1 | / | 65 | 410 | 2.2% |
| 1 | 2-aminophenol | 63 | 391 | <<0.1% |
| 3 | 4-aminophenol | 61 | 361 | <0.1% |
| Comparative 3 | Ethanolamine | 52 | 341 | 0.7% |
| Comparative 4 | Urea | 63 | 355 | 0.3% |
| Comparative 2 | / | 58 | 340 | 11.6% |
| 2 | 2-aminophenol | 56 | 295 | <0.1% |
| 4 | 4-aminophenol | 55 | 315 | 1.8% |

The resins obtained by the method of the invention, while having reduced formaldehyde contents, have thermogravimetric properties entirely comparable with the comparative examples.

The Soxhlet extraction is implemented in the following way:

Introduction of a mass $m_i$ of 1-2 g of recite finely ground in a cellulose cartridge;

Soxhlet extraction for 24 hours at 120-130° C. with ethanol as extraction solvent;

Drying of the cartridge for 5 hours in the oven at 80° C. under air;

Weighing of the cartridge to obtain a mass $m_F$, this mass $m_F$ being determined by the following relation:

$$m_F = m_{cartridge\ after\ drying} - m_{empty\ cartridge}$$

wherein $m_{cartridge\ after\ drying}$ represents the mass of the cartridge after drying in the oven in g and $m_{empty\ cartridge}$ represents the mass of the empty cellulose cartridge.

The loss of mass is then expressed in % and defined as $P_m = m_i/m_F$.

| Example | Compound added | $P_m$ (%) | Formaldehyde content |
|---|---|---|---|
| Comparative 1 | / | 0.9 | 2.2% |
| 1 | 2-aminophenol | 1.0 | <<0.1% |
| Comparative 3 | Ethanolamine | 22.6 | 0.7% |
| Comparative 4 | Urea | 2.9 | 0.3% |
| Comparative 2 | / | 2.4 | 11.6% |
| 2 | 2-aminophenol | 1.8 | <0.1% |

The very low losses of mass for the resins obtained in accordance with the method according to the invention and, particularly with 2-aminophenol, certify the correct integration of compounds added into the network of the resin.

What is claimed is:

1. A method for preparing a resol-type phenolic resin comprising the following steps:

a) a step of condensing phenol and formaldehyde, in a basic medium, the formaldehyde being in molar excess with respect to the phenol, at a condensation temperature of at least 50° C. until the phenol conversion rate is 50 to 80%, whereby a resol-type phenolic resin results comprising free formaldehyde;

b) a step of measuring the free formaldehyde mass content of the phenolic resin obtained in a);

c) a step of reducing the free formaldehyde mass content of the phenolic resin obtained in a) by placing it in contact with a material consisting of an aminophenolic compound and either ethanol or an ethanol and water mixture, the aminophenolic compound being in an excess amount with respect to the free formaldehyde and at a temperature lower than the condensation temperature of step a).

2. The method according to claim 1, wherein the basic medium is an aqueous solution comprising one or more bases selected from NaOH, $Na_2CO_3$, KOH, $K_2CO_3$, $Ba(OH)_2$, $NH_3$, a primary amine, a secondary amine and mixtures thereof.

3. The method according to claim 1, wherein the basic medium is an aqueous solution comprising, as base, $NH_3$.

4. The method according to claim 2, wherein the base(s) of the basic medium is (are) present in a content ranging from 1 to 20% molar with respect to the number of moles of phenol initially present in the condensation step.

5. The method according to claim 1, wherein the mole ratio of formaldehyde to phenol is greater than 1 and less than or equal to 3.

6. The method according to claim 1, wherein the mole ratio of formaldehyde to phenol is 1.1 to 2.

7. The method according to claim 1, wherein the condensation temperature ranges from 50 to 100° C.

8. The method according to claim 1, wherein the condensation step a) is implemented by the sequence of following operations:

an operation of placing in contact phenol and formaldehyde, the formaldehyde being in molar excess with respect to the phenol, the placing in contact being performed under stirring and at a temperature for obtaining a homogeneous mixture;

an operation of adding a basic medium to the homogeneous mixture, the resulting mixture being heated to a temperature corresponding to the condensation temperature and being maintained until the desired phenol conversion rate is obtained;

an operation of stopping the heating once the desired phenol conversion rate has been reached.

9. The method according to claim 1, comprising, before implementing step b), a step of adding to the resin obtained at the end of step a) at least one organic solvent.

10. The method according to claim 1, wherein the aminophenolic compound is a phenolic compound comprising at least one —$NH_2$ primary amine group.

11. The method according to claim 1, wherein the aminophenolic compound is a phenol compound including in ortho, meta or para position of the —OH group, an $NH_2$ primary amine group.

12. The method according to claim 1, wherein the aminophenolic compound meets the following formula:

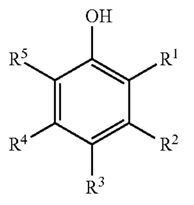

wherein $R^1$ to $R^5$ represent, independently of one another, a hydrogen atom, a $C_1$-$C_5$ alkyl group, a methoxy group, an OH group or an $NH_2$ group with conditions that at least one of $R^1$ or $R^3$ represents an $NH_2$ group and at least one of $R^1$, $R^3$ or $R^5$ represents a hydrogen atom.

13. The method according to claim 1, wherein the aminophenolic compound is 2-aminophenol or 4-aminophenol.

14. The method according to claim 1, wherein the aminophenolic compound is 2-aminophenol.

15. The method according to claim 1, further comprising, after step c), a vacuum concentration step.

16. The method according to claim 1, further comprising, after either step c) or after the condensation step, a step of distilling the resin at a distillation temperature making it possible to eliminate at least one portion of the formaldehyde.

17. A method for obtaining a hardened material from the hardening of a resol-type phenolic resin, said resin comprising phenol and formaldehyde condensates and imine compounds resulting from the reaction of the aminophenolic compound and of the free formaldehyde, said method comprising the following steps:

a step of implementing the method for preparing the resol-type phenolic resin according to claim 1;

a step of hardening the resin thus obtained by heating the latter to a hardening temperature.

18. A method for obtaining a hardened material from the hardening of a resol-type phenolic resin, said resin comprising phenol and formaldehyde condensates and imine compounds resulting from the reaction of the aminophenolic compound and of the free formaldehyde, said method comprising the following steps:

a step of implementing the method for preparing the resol-type phenolic resin according to claim 1;

a step of adding to the resin thus obtained one or more fillers;

a step of hardening the resin comprising one or more fillers by heating the latter to a hardening temperature, whereby a composite material results comprising a matrix resulting from the hardening of the resin and the filler(s) dispersed in the matrix.

* * * * *